UNITED STATES PATENT OFFICE.

FREDERIC BOOTH NICHOLS AND ABBIE THURSTON CRANE, OF NEW YORK, N. Y.; SAID NICHOLS ASSIGNOR TO SAID CRANE.

METHOD OF PRODUCING ORNAMENTAL ENAMEL DESIGNS.

SPECIFICATION forming part of Letters Patent No. 477,568, dated June 21, 1892.

Application filed August 8, 1891. Serial No. 402,153. (No specimens.)

*To all whom it may concern:*

Be it known that we, FREDERIC BOOTH NICHOLS and ABBIE THURSTON CRANE, citizens of the United States, residing at New York, county and State of New York, have invented certain new and useful Improvements in Methods of Producing Ornamental Enamel Designs and Lettering in Various Colors on Glass, Porcelain, Earthenware, &c.; and we do hereby declare that the following is a full, clear, and exact description of the invention, which will enable others skilled in the art to which it appertains to make and use the same.

Our invention consists in producing ornamental designs and lettering in one or more colors on the surface of glass, porcelain, earthenware, or other substances which are or may be covered with a glazing of vitrifiable material by means of various metallic oxides, which may be previously mixed with vitrifiable flux, such as is usually employed for the purpose, and reduced to fine powder; or the metallic oxides alone may be used when reduced to fine powder, and then depend on the material with which the design is printed, stenciled, or painted on with to produce the flux whereby it will vitrify to the surface to be ornamented by the application of heat, and in that respect differs from previous methods, and especially from that specified in Patent No. 167,289, on which this is an improvement.

The mode of operating is as follows: The pigment, whether as the simple oxide of a metal or the oxide previously mixed with a flux, should be first reduced to a fine powder and then mixed with water containing a little wheat-flour or starch to give it slight adhesion, and ground up into a paint to be applied with a brush to the surface to be decorated, care being taken not to have enough adhesive material to fill up the pores of the coating when dry, as that would prevent the material which is used to print, stencil, or paint on the design from saturating it and thereby defeat the purpose. Where but one color is to be used, it is applied to the part to be ornamented and allowed to dry. The design is then applied either by printing or by the other means mentioned. The material used, which serves the double purpose of a fixative and a flux, is silicate of soda or soluble glass, which may be substituted by silicate of potash and soda. When the pigment already applied contains sufficient flux to vitrify it on firing, it can be quite dilute and only sufficient to cement the pigment to the surface on drying but when only metallic oxides are used the solution of soluble glass should be much stronger or in the state of a thin sirup, which will cause the metallic oxide to vitrify and bring out the color on firing in the kiln. After the design has been applied by any of the above-mentioned methods it is allowed to dry hard. Soluble glass being insoluble in cold water allows of the superfluous pigment being washed off and leaves the design cemented by the soluble glass remaining on the surface, after which it is ready for the kiln; but as the soluble glass still contains water the heat must be very carefully applied at first to drive it out, as otherwise it would intumesce and honeycomb the design.

When various colors are required in the same design, an outline of it is first printed or marked on with aniline color, which adheres readily to the glass or other glazed surface, after which the pigments representing the different colors as developed by heat are painted on the different parts of the outline, the same as would be done if they were at once to appear in their own respective colors, but not with the same care, as it can largely overrun the outlines, provided they do not encroach on the parts to receive another color, but can to a considerable extent be blended together where required. The colors should be prepared the same as if a single color was to be used, and the after treatment is the same, except that the design must be printed on with a flexible stamp or stencil and must register correctly with the outline previously applied and suitable means must be adopted to insure that result. The advantages of this over hand painting, as usually done for this purpose, is the rapidity with which it can be executed by those having but little artistic skill.

Another method, which for some purposes presents great advantages over the preceding ones, is to paint, print, or stencil the design on with soluble glass in a thick sirupy condition. This should have sufficient coloring material incorporated with it to readily see the design, and on this before it dries is sprinkled in the state of fine dry powder or otherwise applied the different pigments, which will only adhere where the soluble glass is placed. After properly drying it is ready for firing in the kiln, and if care is taken to have sufficient material applied considerable relief may be obtained in the design. In this method the metallic oxides alone may be used in fine powder, as the soluble glass is sufficient to vitrify them. Where it is desirable to reduce the strength of the color more or less, infusorial earth may be mixed with them for that purpose and should be thoroughly incorporated. Finely, divided silica or white clay may be substituted for that purpose. Where the surface to be decorated is flat, or nearly so, there is no difficulty in applying the design by means of a rubber stamp or stencil; but where the surfaces are rounding or otherwise irregular there is considerable difficulty with an ordinary rubber stamp and necessitates something more flexible.

There is a marked difference between our invention and the one specified in Patent No. 167,289, inasmuch as the soluble glass not only performs the function of making the pigment forming the design adhere, but also the highly-important one of a flux, whereby less heat is required in the firing, and therefore in case of glass vessels there is no danger of their sagging out of shape, and even for porcelain it presents the advantage of less time being required for the operation, and in said patent no provision is made for more than one color to be produced in the same design.

Having fully described our invention, what we desire to claim and to secure by Letters Patent is—

The method of producing designs in enamel colors, which consists in the application of soluble glass to the portions of the surface to be enameled, whereby the soluble glass serves first as a binder to hold the vitrifiable materials upon said surface prior to fusing and afterward serves as a flux in the vitrified enamel, substantially as set forth.

FREDERIC BOOTH NICHOLS.
ABBIE THURSTON CRANE.

Witnesses:
JOHN MORRIS,
WILLIAM S. TISDALE.